(12) United States Patent
Mozer et al.

(10) Patent No.: US 8,996,381 B2
(45) Date of Patent: Mar. 31, 2015

(54) BACKGROUND SPEECH RECOGNITION ASSISTANT

(75) Inventors: Todd F. Mozer, Los Altos Hills, CA (US); Pieter J. Verneulen, Portland, OR (US)

(73) Assignee: Sensory, Incorporated, Santa Clara, CA (US)

( * ) Notice: Subject to any disclaimer, the term of this patent is extended or adjusted under 35 U.S.C. 154(b) by 431 days.

(21) Appl. No.: 13/246,666

(22) Filed: Sep. 27, 2011

(65) Prior Publication Data

US 2013/0080171 A1     Mar. 28, 2013

(51) Int. Cl.
| | |
|---|---|
| *G10L 21/00* | (2013.01) |
| *G10L 15/22* | (2006.01) |
| *G10L 15/32* | (2013.01) |

(52) U.S. Cl.
CPC ............ *G10L 15/22* (2013.01); *G10L 2015/223* (2013.01); *G10L 15/32* (2013.01)
USPC ............................ 704/270; 704/231; 704/275

(58) Field of Classification Search
CPC ........ G10L 15/08; G10L 15/22; G10L 15/265
USPC .................. 704/231, 235, 236, 252, 270, 275
See application file for complete search history.

(56) References Cited

U.S. PATENT DOCUMENTS

| | | | |
|---|---|---|---|
| 5,983,186 A | 11/1999 | Miyazawa et al. | |
| 6,477,500 B2 * | 11/2002 | Maes | 704/275 |
| 7,769,593 B2 * | 8/2010 | Venkataraman et al. | 704/275 |
| 7,822,318 B2 * | 10/2010 | Miller | 386/248 |
| 8,234,119 B2 * | 7/2012 | Dhawan et al. | 704/270 |
| 8,335,683 B2 | 12/2012 | Acero et al. | |
| 8,452,597 B2 * | 5/2013 | Bringert et al. | 704/251 |
| 8,558,697 B2 * | 10/2013 | Clough | 340/545.1 |
| 8,768,707 B2 | 7/2014 | Mozer | |
| 2002/0116196 A1 * | 8/2002 | Tran | 704/270 |
| 2003/0097255 A1 * | 5/2003 | Gordon | 704/205 |
| 2004/0128137 A1 * | 7/2004 | Bush et al. | 704/275 |
| 2004/0148170 A1 * | 7/2004 | Acero et al. | 704/257 |
| 2004/0236575 A1 * | 11/2004 | Goronzy et al. | 704/231 |
| 2005/0137866 A1 | 6/2005 | Dow et al. | |
| 2005/0165609 A1 * | 7/2005 | Zuberec et al. | 704/270 |
| 2006/0009980 A1 * | 1/2006 | Burke et al. | 704/270 |
| 2006/0074658 A1 * | 4/2006 | Chadha | 704/246 |
| 2006/0080105 A1 * | 4/2006 | Lee et al. | 704/270.1 |
| 2006/0085199 A1 * | 4/2006 | Jain | 704/275 |

(Continued)

FOREIGN PATENT DOCUMENTS

KR    10-2008-0052304 A    6/2008

OTHER PUBLICATIONS

U.S. Appl. No. 12/831,051, Jonathan Shaw et al.

(Continued)

*Primary Examiner* — Douglas Godbold
(74) *Attorney, Agent, or Firm* — Fountainhead Law Group P.C.

(57) ABSTRACT

In one embodiment, a method receives an acoustic input signal at a speech recognizer configured to recognize the acoustic input signal in an always on mode. A set of responses based on the recognized acoustic input signal is determined and ranked based on criteria. A computing device determines if the response should be output based on a ranking of the response. The method determines an output method in a plurality of output methods based on the ranking of the response and outputs the response using the output method if it is determined the response should be output.

18 Claims, 9 Drawing Sheets

(56) References Cited

U.S. PATENT DOCUMENTS

| | | |
|---|---|---|
| 2006/0111894 A1* | 5/2006 | Sammarco et al. ............... 704/9 |
| 2006/0287854 A1* | 12/2006 | Smolenski et al. ........... 704/231 |
| 2008/0167868 A1* | 7/2008 | Kanevsky et al. ............ 704/233 |
| 2008/0208578 A1 | 8/2008 | Geller |
| 2008/0215337 A1* | 9/2008 | Greene et al. ................. 704/275 |
| 2009/0043580 A1* | 2/2009 | Mozer et al. .................. 704/251 |
| 2009/0122970 A1 | 5/2009 | Kearney |
| 2009/0313165 A1 | 12/2009 | Walter |
| 2009/0327263 A1 | 12/2009 | Maghoul |
| 2010/0198598 A1 | 8/2010 | Herbig et al. |
| 2010/0241428 A1 | 9/2010 | Yiu |
| 2011/0054900 A1* | 3/2011 | Phillips et al. ................ 704/235 |
| 2011/0054905 A1 | 3/2011 | Lagadec et al. |
| 2011/0093267 A1 | 4/2011 | Witzman |
| 2011/0166855 A1 | 7/2011 | Vermeulen et al. |
| 2011/0307256 A1* | 12/2011 | Schultz ........................ 704/246 |
| 2012/0052907 A1 | 3/2012 | Gilbreath et al. |
| 2013/0080167 A1 | 3/2013 | Mozer |
| 2013/0080171 A1* | 3/2013 | Mozer et al. .................. 704/251 |

OTHER PUBLICATIONS

U.S. Appl. No. 13/217,134, Jonathan Shaw et al.
International Search Report dated Feb. 28, 2013 from International Application No. PCT/US2012/056351 filed Sep. 20, 2012.
Non-Final Office Action mailed Nov. 25, 2013 from U.S. Appl. No. 13/329,017; 20 pages.
Publication No. WO/2013/048876, including International Search Report, published on Apr. 4, 2014; 37 pages.
U.S. Appl. No. 14/280,261, filed May 16, 2014 by Todd F. Mozer; 34 pages.

* cited by examiner

FIG. 8

BACKGROUND SPEECH RECOGNITION ASSISTANT

BACKGROUND

Particular embodiments generally relate to speech recognition.

Speech recognition attempts to make information access easier and simpler through verbal queries and commands. These queries have historically been activated by button presses on a device, such as a smart phone. Using verbal queries allows users to make queries without typing in the query. This makes information access easier when users are busy, such as when users are in cars or simply would not like to type in the queries. After the button press is received, a speech recognizer listens to the query and attempts to respond appropriately. Even though using the button press is easier, sometimes having a user press a button to activate the speech recognizer is inconvenient for a user. For example, the user may be occupied with other activities where using his/her hands to perform the button press may not be possible, such as a user may be driving a car.

Other approaches replace button presses with hands-free approaches that activate the speech recognizer using activation words. For example, trigger phrases are used to activate the speech recognizer, which can then decipher a query and provide an appropriate response after the trigger phrase is received. However, the user must always trigger the speech recognizer. Additionally, since the user has triggered the recognizer, errors in the recognition or responses are typically not tolerated by the user.

In all these approaches, a user is deciding when to issue a query or command. The speech recognizer is affirmatively activated and then a response is expected by the user. Because the user is expecting a response, errors in speech recognition may not be tolerated. Also, because the speech recognizer is only listening for content after activation, certain contexts and important points in a conversation will be missed by the speech recognizer.

SUMMARY

In one embodiment, a method receives an acoustic input signal at a speech recognizer configured to recognize the acoustic input signal in an always on mode. A set of responses based on the recognized acoustic input signal is determined and ranked based on criteria. A computing device determines if the response should be output based on a ranking of the response. The method determines an output method in a plurality of output methods based on the ranking of the response and outputs the response using the output method if it is determined the response should be output.

In one embodiment, a method receives an acoustic input signal at a first stage recognizer. The first stage recognizer is configured to recognize the acoustic input signal in an always on mode. A computing device classifies portions of the acoustic input signal into different classifications using a first speech recognition algorithm. The method determines a second stage recognizer should be triggered based on a selection of a classification based on classified portions being classified with the selected classification and triggers the second stage recognizer to turn on to recognize the acoustic input signal. The second stage recognizer is configured to use a second speech recognition algorithm different from the first speech recognition algorithm to recognize the acoustic input signal.

In one embodiment, a method receives a signal from a first stage recognizer based on recognition of an acoustic input signal and classification of portions of the acoustic input signal into a classification in a plurality of classifications using a first speech recognition algorithm. The first stage recognizer is configured to recognize the acoustic input signal in an always on mode. A computing device activates the second stage recognizer on upon receiving the signal to recognize the acoustic input signal. The second stage recognizer is configured to use a second speech recognition algorithm. The method determines a response to the recognized acoustic input signal; determines if the response should be output based on a ranking of the response; and outputs the response if it is determined the response should be output.

In one embodiment, a system includes a first stage recognizer configured to recognize the acoustic input signal using a first speech recognition algorithm in an always on mode. The first stage recognizer is configured to: receive an acoustic input signal; classify portions of the acoustic input signal into different classifications using a first speech recognition algorithm; determine a second stage recognizer should be triggered based on a selection of a classification based on classified portions being classified with the selected classification. A second stage recognizer is configured to: receive a signal from the first stage recognizer to activate the second stage recognizer; activate the second stage recognizer upon receiving the signal to recognize the acoustic input signal, the second stage recognizer configured to use a second speech recognition algorithm different from the first speech recognition algorithm to recognize the acoustic input signal; determine a response to the recognized acoustic input signal; determine if the response should be output based on a ranking of the response; and output the response if it is determined the response should be output.

The following detailed description and accompanying drawings provide a better understanding of the nature and advantages of the present invention.

DETAILED DESCRIPTION

Described herein are techniques for a background speech recognizer. In the following description, for purposes of explanation, numerous examples and specific details are set forth in order to provide a thorough understanding of embodiments of the present invention. Particular embodiments as defined by the claims may include some or all of the features in these examples alone or in combination with other features described below, and may further include modifications and equivalents of the features and concepts described herein.

Figure 1A:
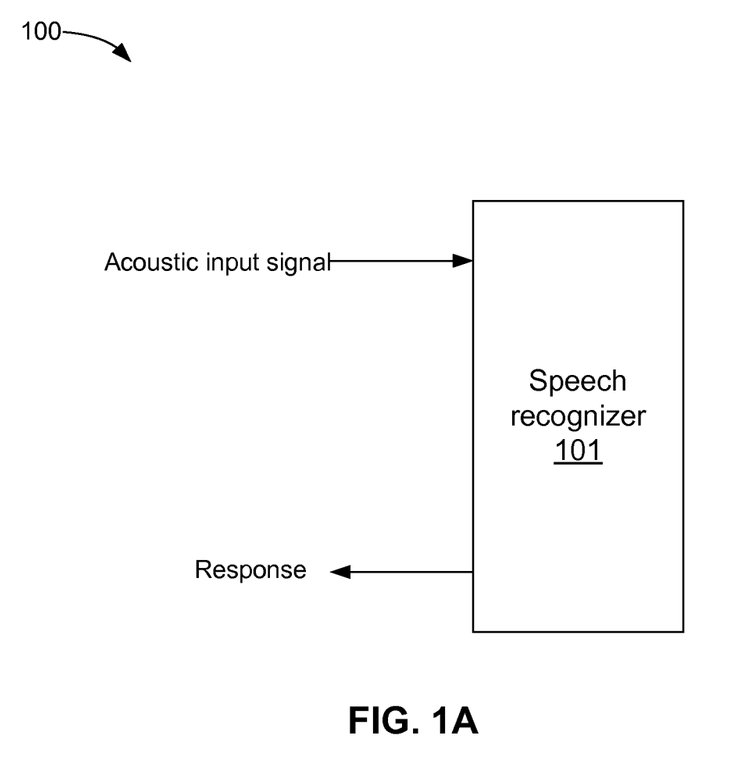
FIG. 1A depicts an example system of a speech recognition system according to one embodiment.

FIG. 1A depicts an example system 100 of a speech recognition system according to one embodiment. System 100 includes a speech recognizer 101 that is "always on" and listening to acoustic input signals received. Thus, speech recognizer 101 is working in the background. Speech recognizer 101 is not listening for a trigger phrase to turn on. Rather, speech recognizer 101 is collecting real meaning and intent from everyday conversation. Because speech recognizer 101 is always on and listening, meaning and intent may be determined from phrases that might not normally be recognized if speech recognizer 101 had to be activated based on a trigger.

Speech recognizer 101 may be determining possible responses in the background, but may not output the responses until it is determined it is appropriate to output a response. The responses may be determined using various methods based on the classifications and interpretations of the acoustic input signal. For example, searches may be performed to determine responses, databases may be searched for appropriate responses, etc. Speech recognizer 101 may rank responses that are determined from the recognized meaning of the phrases. The ranking and type of response (e.g. momentary display on screen, long lasting display on screen, verbal response, etc.) may be based on criteria, such as relevance, urgency, and/or importance. When a response receives a ranking of a value that indicates the response can be outputted, then speech recognizer 101 may output the response. Because a user has not specifically called speech recognizer 101 to ask for a response, errors in speech recognition may not be considered fatal. For example, speech recognizer 101 may evaluate the responses before outputting the response. If the response is not deemed acceptable, then no response may be output. Because the user has not asked for a response, then the user will not know that a response with an error in it was not provided. However, if the user had asked for a specific response, then it would be unacceptable for errors to be in the response. In this case, the user has not asked for a response.

Different methods of outputting the response may be based on the ranking that is determined. For example, responses with higher ranking scores may use more intrusive output methods. For example, a verbal output may be used if there was a high level of urgency in the ranking. However, if the urgency is lower, than a less intrusive method may be used, such as displaying a picture or advertisement in a corner of a screen. The length of time the picture or advertisement is displayed could be determined by the importance. Speech recognizer 101 is an assistant that is always on providing help and solutions without being asked, but being smart enough to only intrude when it is determined to be appropriate because of urgency, etc.

In one example, a first user may be discussing whether to buy a microwave oven with a second user. The conversation may be discussing what wattage or style (e.g., stainless steel) to buy. Speech recognizer 101 may be situated in a mobile device, such as a cellular phone or tablet, and has not been triggered by the first user or the second user. Speech recognizer 101 may not immediately output a response. Instead, speech recognizer 101 listens to the conversation to derive additional meaning. When speech recognizer 101 classifies the discussion as a "purchase" discussion, it may recognize that a stainless steel microwave is looking to be purchased, speech recognizer 101 may determine that a response is appropriate. In this case, it is determined that the user is looking to buy a microwave of a certain wattage is looking to be purchased. Certain responses may have been ranked. For example, a sale at a store may be one response. This response is given a high score because of the relevance (the sale is for a microwave) and the also the urgency (the sale is a limited time offer and/or speech recognizer 101 overhead a sense of urgency in the discussion because it identified that the existing microwave was broken). Thus, an intrusive response of verbal output that a sale at the store is available may be output, and prompt that the item they are looking for is only on sale for 24 hours.

Figure 1B:
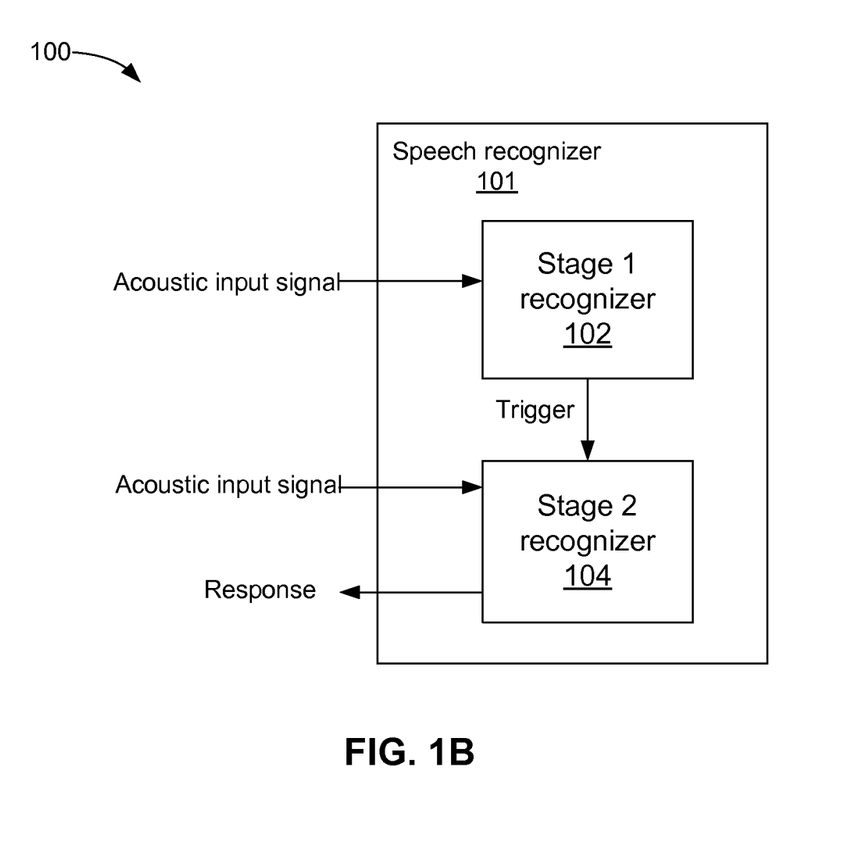
FIG. 1B depicts an example system for providing a two-stage speech recognizer according to one embodiment.

FIG. 1B depicts an example system 100 for providing a two-stage speech recognizer according to one embodiment. Two-stage speech recognizer may perform the functions of speech recognizer 101. Also, although two stages are described, the functions of both stages may be combined into one stage or any number of stages. System 100 includes a stage 1 recognizer 102 and a stage 2 recognizer 104. Stage 1 recognizer 102 and stage 2 recognizer 104 may be located in a same device or in different devices. For example, stage 1 recognizer 102 and stage 2 recognizer 104 may be located in a mobile device, such as smart phones, tablet computers, laptop computers, handheld gaming devices, toys, in-car devices, and other consumer electronics. Additionally, stage 1 recognizer 102 may be located on a first device, such as a client device, and stage 2 recognizer 104 may be located on a second device, such as a server. Stage 1 recognizer 102 may communicate with stage 2 recognizer 104 over a network in this example.

Stage 1 recognizer 102 may be a speech recognition device that is "always on" and listening to acoustic input signals received. Always on may mean that stage 1 recognizer does not need to be triggered (e.g., by a button press or trigger phrase) to begin speech recognition. Examples of always on speech recognizers are included in U.S. patent application Ser. No. 12/831,051, entitled "Systems and Methods for Hands-free Voice Control and Voice Search", filed Jul. 6, 2010, claims the benefit of priority from U.S. Patent Application No. 61/223,172, filed Jul. 6, 2009, and in U.S. patent application Ser. No. 12/831,051, entitled "Reducing False Positives in Speech Recognition Systems", filed Aug. 24, 2011, all of which are incorporated by reference in their entirety for all purposes. For example, any acoustic input signals received by stage 1 recognizer 102 may be analyzed. In one embodiment, stage 1 recognizer 102 is different from stage 2 recognizer 104. For example, stage 1 recognizer 102 may be a low-power recognizer that uses less power than stage 2 recognizer 104. Lower power may be used because the speech recognition algorithm used by stage 1 recognizer 102 may use a smaller memory and fewer computer processor unit (CPU) cycles. For example, stage 1 recognizer 102 may be able to run with a audio front end (e.g., microphone) being on while the CPU processor is running at a lower clock speed or switching on for a short burst while mostly sleeping.

The speech recognition algorithm of stage 1 recognizer 102 may classify keywords that are recognized into pre-defined classifications. Pre-defined classifications may be topics that describe different areas of interest, such as travel, purchases, entertainment, research, food, or electronics. Each classification may be associated with a limited set of keywords. In one embodiment, stage 1 recognizer 102 may be looking for a limited vocabulary of keywords. If a certain number of keywords for a specific classification are detected, then it may be determined that a topic associated with the classification is being discussed. In additions to the number of keywords, the keywords relation to each other; i.e. the search grammar and/or language model may be used as well. Stage 1 recognizer 102 classifies recognized keywords into classifications, and when one classification has enough keywords classified with it, then stage 1 recognizer 102 may trigger stage 2 recognizer 104. Other criteria may also be used, which will be described below.

Stage 2 recognizer 104 may be a more accurate speech recognition system as compared to stage 1 recognizer 102. For example, stage 2 recognizer 104 may use more power than stage 1 recognizer 102. Also, stage 2 recognizer 104 uses a more accurate speech recognition algorithm. For example, stage 2 recognizer 104 may require a large memory and CPU cycle footprint to perform the speech recognition. In one example, stage 2 recognizer 104 may use large-vocabulary continuous speech recognition (LVCSR) techniques to describe the language of a specific topic (language model) and converts the acoustic input signal into a probable word trellis that is then accurately parsed using a statistical parser to extract meaning. Stage 1 recognizer 102 or stage 2 recognizer 104 may decide to save information from previous discussions to better classify, solve problems and assist.

In one embodiment, some differences may exist between the speech recognition algorithms. For example, stage 1 recognizer 102 is a keyword based recognizer while stage 2 recognizer 104 may recognize all words. Stage 1 recognizer 102 may have a less complex search grammar than stage 2 recognizer 104; e.g. lower perplexity and lower number of words. Stage 1 recognizer 102 may have a less complex language model than stage 2 recognizer 104 (e.g., number of words, bi-gram vs. tri-gram). Stage 1 recognizer 102 may prune the active states in the search more than stage 2 recognizer 104. Stage 1 recognizer 102 parsing may be simple or non-existent while stage 2 recognizer 104 has a robust statistical parser. Stage 1 recognizer 102 may require less read only memory (ROM) to store the representation and less random access memory (RAM)/millions instructions per second (mips) to score input acoustics against it. Stage 1 recognizer 102 may be a less accurate recognizer than stage 2 recognizer 104 and may use simpler speech features than stage 2 recognizer 104. Stage 1 recognizer 102 may use a smaller/simpler acoustic model than stage 2 recognizer 104.

Stage 2 recognizer 104 may output a response to the detected meaning. For example, when a meaning is determined from the acoustic input signal, stage 2 recognizer 104 may determine an appropriate response. The response may include a variety of sensory interactions including audio, visual, tactile, or olfactory responses. In one example, the output may be an audio response that offers a suggested answer to a discussion the user was having. Other responses may also be provided that enhance a user activity, such as when a user is performing a search on a computer or a television guide, more focused search results may be provided based on stored information from background conversations or immediately spoken information while the search is being conducted. For example, while a search for a movie is being conducted from a text input such as "bad guy movie" the user might say something like "I think it's a remake of a movie, maybe Cape something or other . . . . " Another example, certain television shows about travel on the television guide may be displayed at the top of the guide if it is detected a user is discussing travel.

Figure 2:
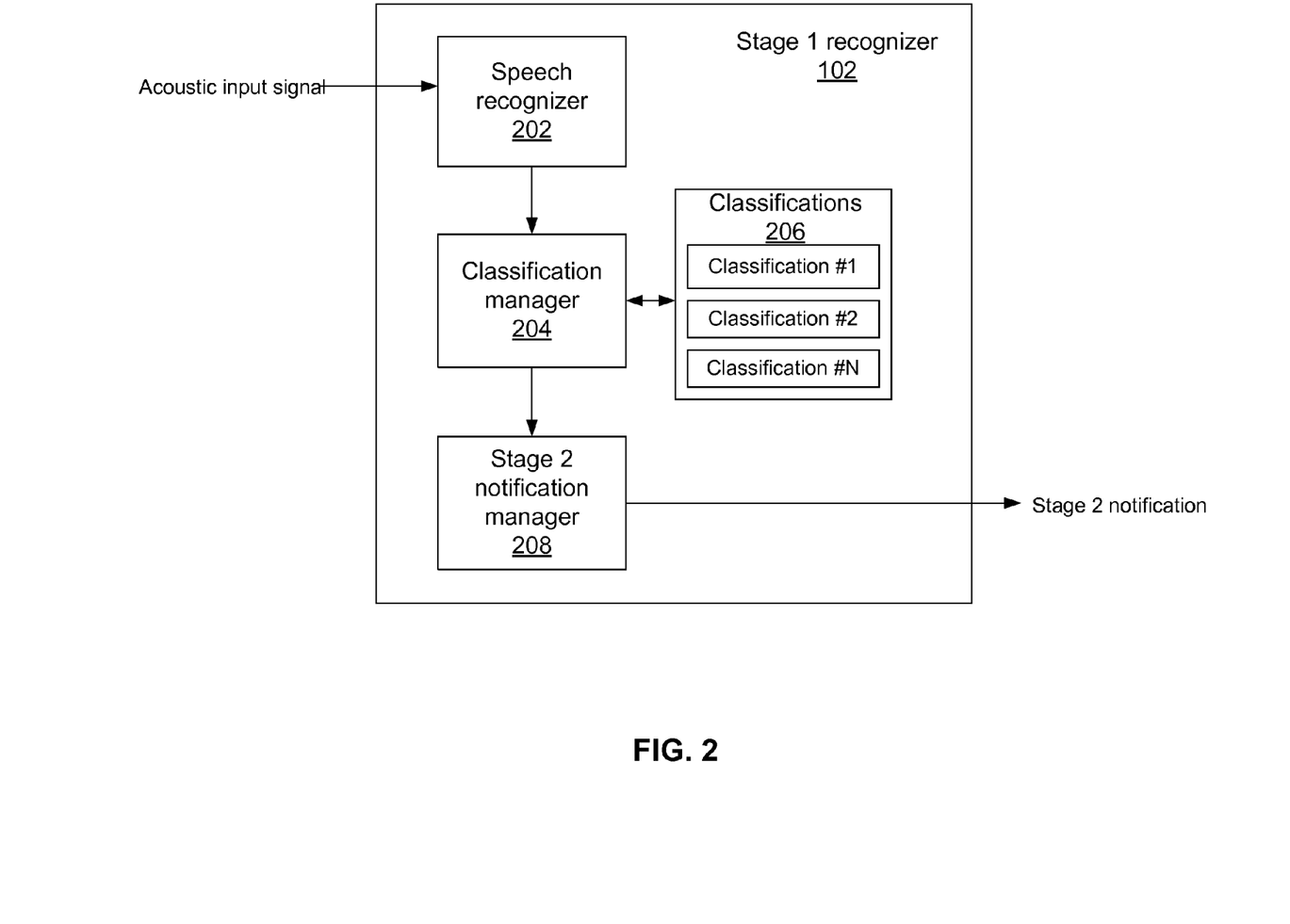
FIG. 2 depicts a more detailed example of a stage 1 recognizer according to one embodiment.

FIG. 2 depicts a more detailed example of stage 1 recognizer 102 according to one embodiment. A speech recognizer 202 receives an acoustic input signal. For example, the acoustic input signal may be conversations that are being detected by an audio front-end of a device. Speech recognizer 202 recognizes certain keywords. The grammar that is being used by speech recognizer 202 may be limited and less than a grammar used by the stage 2 recognizer 104.

A classification manager 204 may classify recognized keywords into classifications 206. Each classification 206 may be associated with a category or topic. Classifications 206 may be pre-defined and a classification 206 may be selected when a number of recognized keywords meet certain criteria. For example, high frequency phrases may be identified by speech recognizer 202. These phrases may uniquely and robustly identify a topic. The frequency of the phrases in addition to the order and distance in time may be used to determine if a classification 206 is selected. These criteria may be defined in classification-specific grammar that is used to determine if a classification 206 is triggered. Once a sufficient number of phrases in an expected relationship to each other are detected, then it may be determined that there is a high probability of certainty that a specific topic is being discussed and a classification 206 is selected.

Figure 3:
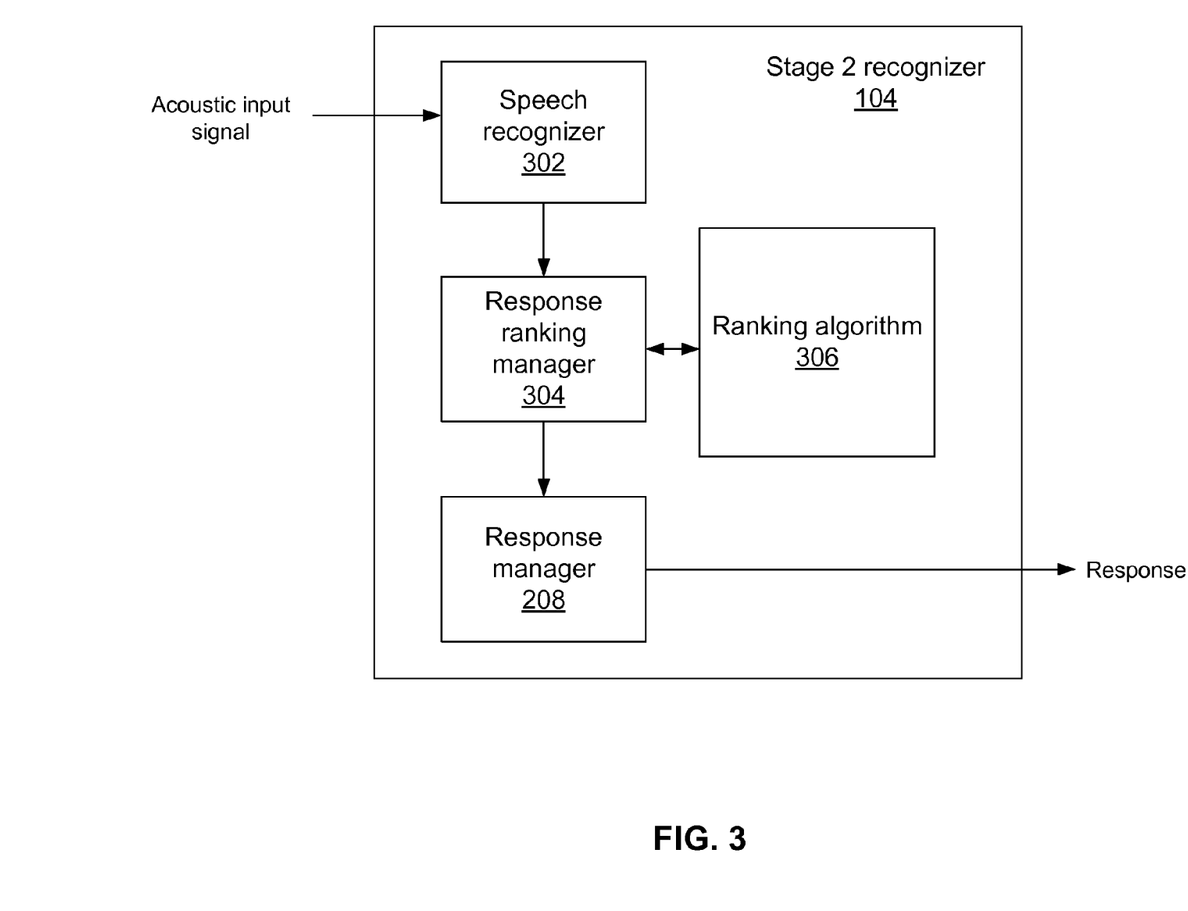
FIG. 3 depicts a more detailed example of a stage 2 recognizer according to one embodiment.

When a classification 206 is selected, a stage 2 notification manager 208 is used to trigger stage 2 recognizer 104. FIG. 3 depicts a more detailed example of stage 2 recognizer 104 according to one embodiment. A speech recognizer 302 receives an acoustic input signal when stage 2 recognizer 104 is triggered. The speech recognition algorithm used to recognize terms in the acoustic input signal may be more accurate than that used by stage 1 recognizer 102.

The classification 206 that is received may also be used to perform the speech recognition. For example, a subset of a vocabulary of words may be selected to perform the recognition.

The responses may be determined in various ways. For example, the meaning of a recognized sentence may be used to search for possible responses. Other methods may also be used, based more on perceived intent than what was actually spoken. Possible responses may also be narrowed based on the classification. For example, when the classification is travel, responses determined are narrowed to be ones associated with travel only. For the multistage recognition process, the classification technique permits stage 1 recognizer 102 to focus on a simpler and easier task of classifying, as opposed to stage 2 recognizer 104, which focuses more on meaning. For example, the "classification" at stage 1 can use the embedded lower power always on system, so the higher powered recognizer only needs to be called up when necessary.

A response ranking manager 304 ranks possible responses based on a ranking algorithm 306. The ranking may be used to determine how to respond. For example, a higher ranking may indicate that a response should be more obvious and intrusive, such as an output audio response. However, a lower ranking may indicate a more subtle response, such as displaying a message on a display on an interface.

In one embodiment, ranking algorithm 306 may rank responses based on criteria, such as relevance, urgency, and/or importance. Relevance may be how relevant the response is to the detected meaning. Urgency is how urgent is the response needed, such as when does a user wants to do something, or is an offer that may be provided in response expiring. Importance may define how important the response may be to the user; for example, importance may be determined if the conversation between users is long or the request has been repeated from something said earlier. Other criteria might also be used, such as information that is inferred from the conversation Importance of information for example can affect the display size and timing.

Multiple responses may be ranked. In one example, the highest ranked response may be output by a response manager 308. In other embodiments, multiple responses may be output simultaneously or in order. Also, a response may not be output based on the ranking, such as if no response is determined with a score high enough to be output. Because a user may not have triggered stage 1 recognizer 102 or stage 2 recognizer 104, the user is not expecting a response, and thus, responses may only be output when an appropriate ranking is determined.

Figure 4:
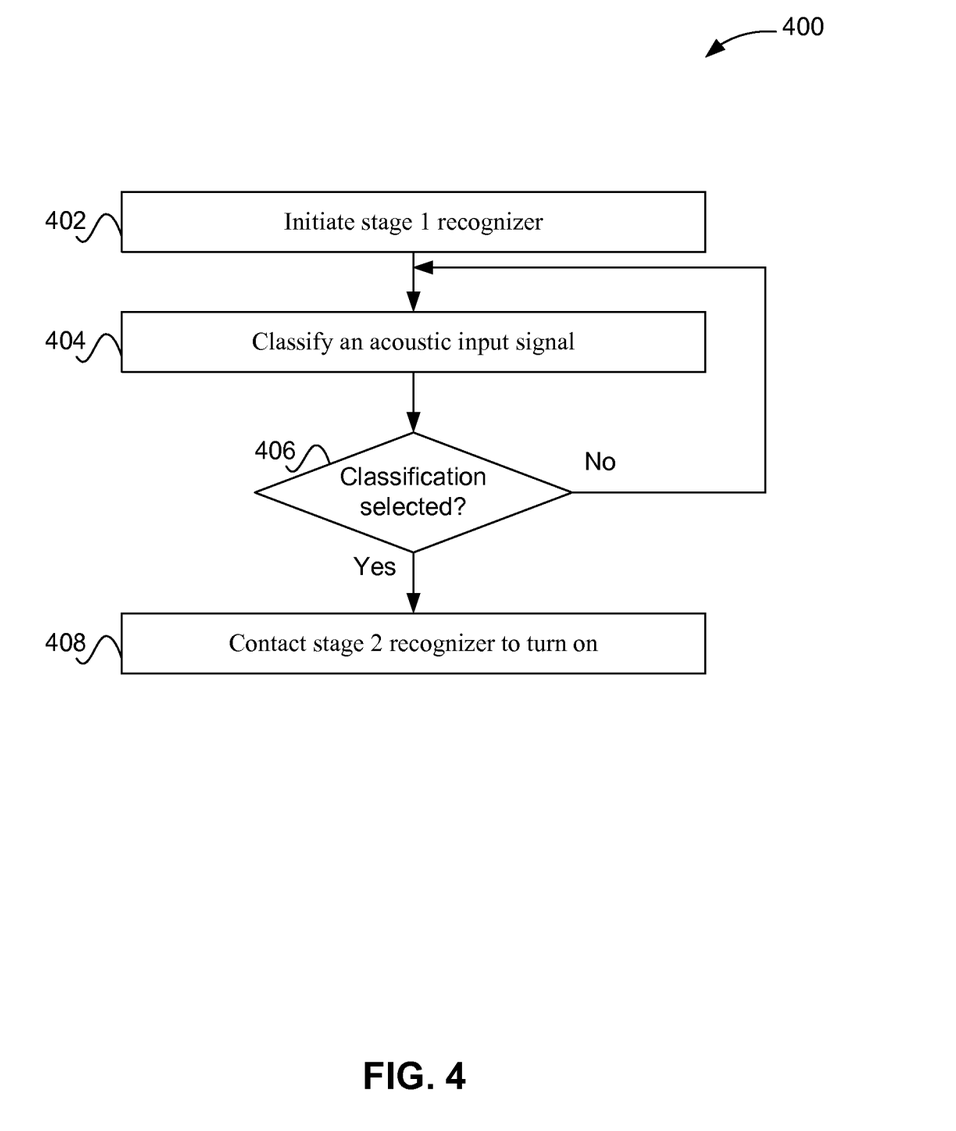
FIG. 4 depicts a simplified flowchart of a method for performing speech recognition using two stages according to one embodiment.

FIG. 4 depicts a simplified flowchart 400 of a method for performing speech recognition using two stages according to one embodiment. At 402, stage 1 recognizer 102 is initiated. Stage 1 recognizer 102 may be always on.

At 404, stage 1 recognizer 102 classifies an acoustic input signal. For example, different keywords recognized in the acoustic input signal may be classified. At 406, stage 1 recognizer 102 determines if a classification 206 is selected. For example, if a number of keywords are classified in a classification 206, then it may be determined that stage 2 recognizer 104 should be triggered. If not, the process continues to perform the classification in 404. At 408, stage 1 recognizer 102 contacts stage 2 recognizer 104 to turn on stage 2 recognizer 104.

Figure 5:
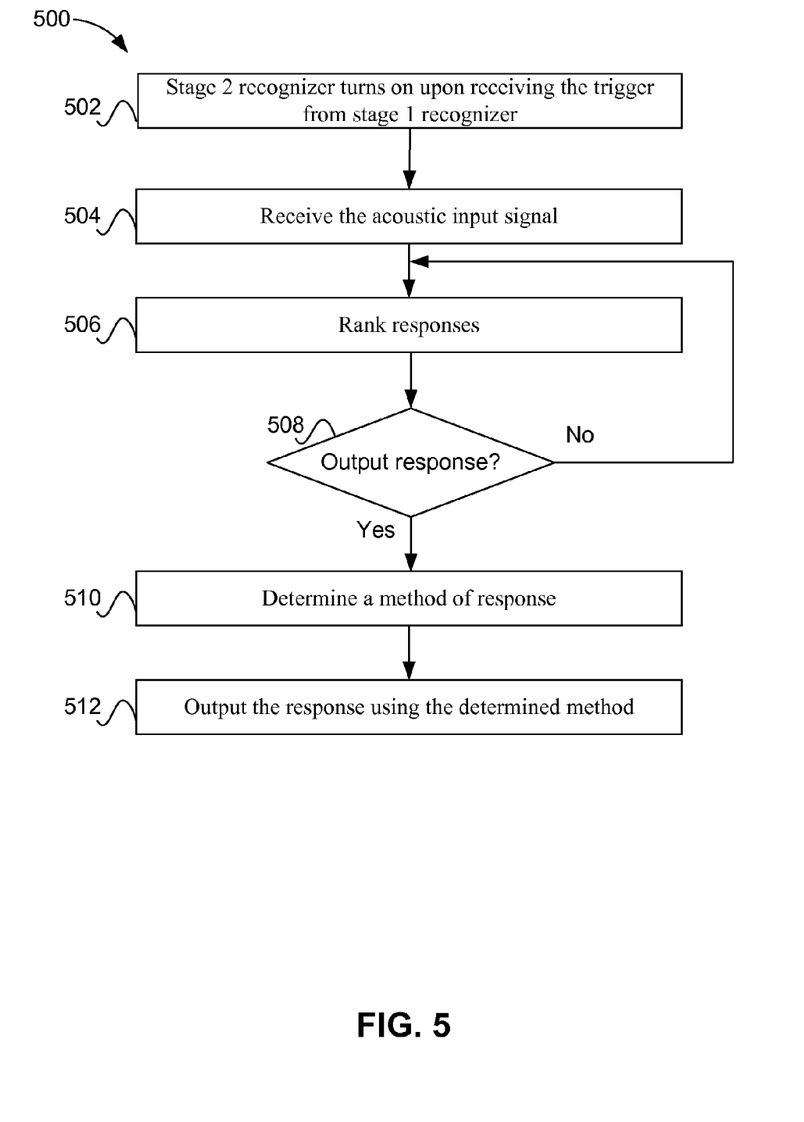
FIG. 5 depicts a simplified flowchart of a method for processing an acoustic input signal at the stage 2 recognizer according to one embodiment.

FIG. 5 depicts a simplified flowchart 500 of a method for processing an acoustic input signal at stage 2 recognizer 104 according to one embodiment. At 502, stage 2 recognizer 104 turns on upon receiving the trigger from stage 1 recognizer 102. Stage 2 recognizer 104 is not always on and only turns on when triggered by stage 1 recognizer 102.

At 504, stage 2 recognizer 104 receives the acoustic input signal. For example, if stage 2 recognizer 104 is co-located with stage 1 recognizer 102, then the acoustic input signal may be received at stage 2 recognizer 104. However, if stage 2 recognizer 104 is located remotely, such as at a server, stage 1 recognizer 102 may send the acoustic input signal to stage 2 recognizer 104.

At 506, stage 2 recognizer 104 ranks responses. For example, criteria as described above are used to rank various responses. At 508, stage 2 recognizer 104 determines if a response should be output. The determination may be based on the ranking. For example, when a response receives a high enough score, then the response is output. If a response to output is not determined, then the process continues at 506 where responses continue to be ranked based on the received acoustic input signal.

If a response to output is determined, at 510, stage 2 recognizer 104 determines a method of response. For example, different responses may be determined based on the ranking. When a response has a high ranking, it may be deemed more important and thus a more intrusive response is provided, such as an audio output. However, when a response is ranked lower, then the response may be less intrusive, such as a message displayed on an interface. At 512, stage 2 recognizer 104 outputs the response using the determined method.

Figure 6:
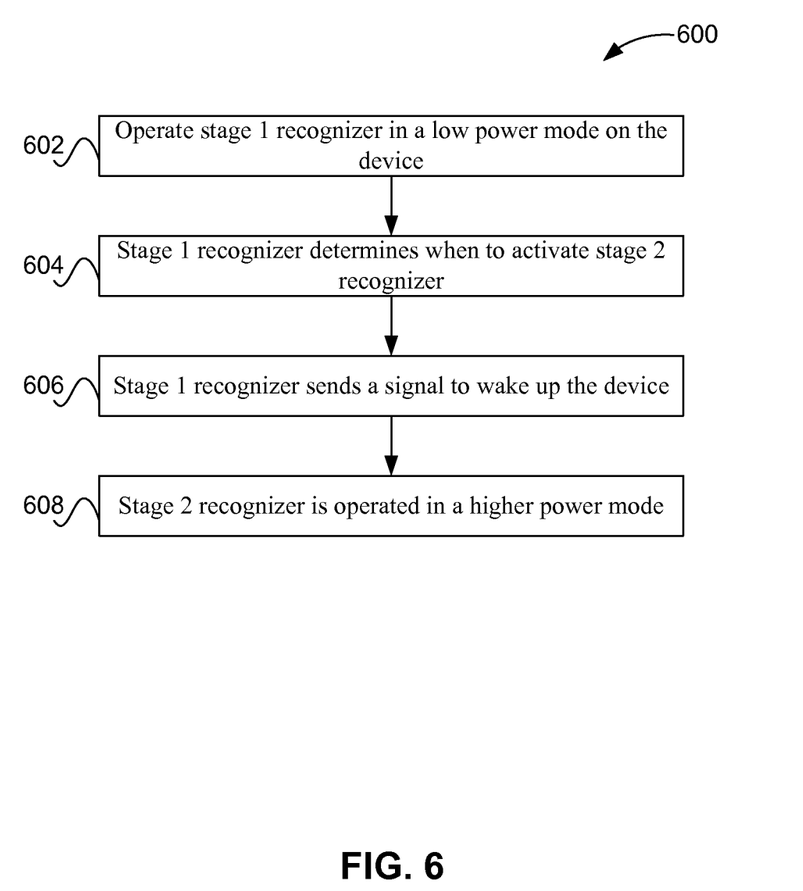
FIG. 6 depicts a simplified flowchart of a method for operating stage 1 recognizer and stage 2 recognizer in a single device according to one embodiment.

In one embodiment, stage 1 recognizer 102 and stage 2 recognizer 104 may be operating in a single device. The device may be powered by a battery in which battery life may be important. The use of stage 1 recognizer 102, which uses less power, but is always on, and triggering a more powerful stage 2 recognizer 104, which uses more power, may be desirable in this type of device. FIG. 6 depicts a simplified flowchart 600 of a method for operating stage 1 recognizer 102 and stage 2 recognizer 104 in a single device according to one embodiment. At 602, stage 1 recognizer 102 is operated in a low power mode on the device. For example, the device may be in a standby mode in which stage 1 recognizer 102 is operating in the background. Because stage 1 recognizer 102 may require fewer CPU cycles, stage 1 recognizer 102 may operate while the device is on standby. Standby is different from an active mode where the device may be fully powered. For example, in standby mode the screen light would be turned off and no functions would be enabled beyond the microphone preamp circuitry and a lightweight processor (e.g. lower clock cycle implementation, etc.). Although the recognize remains on, all other functions are powered down to minimize power consumption. These recognition modes and stages may automatically be determined to save power. For example, a plugged in device might be always on acting as a single recognizer, whereas a battery powered device might use the lower powered stage 1 approach. Also, stage 1 recognizer 102 may be operating while the device is not in standby mode, but is operating as a background process. Thus, while the device is being used, it does not use significant CPU processing power that might degrade the performance of the device.

At 604, stage 1 recognizer 102 determines when to activate stage 2 recognizer 104. For example, a classification 206 may be selected. At 606, stage 1 recognizer 102 sends a signal to wake up the device. For example, the device may be woken up from a standby mode into an active mode.

At 608, stage 2 recognizer 104 is operated in a higher power mode. For example, stage 2 recognizer 104 may require more CPU cycles to perform the speech recognition. Additionally, stage 2 recognizer 104 may have to be operated while the device is in the active mode.

Figure 7:
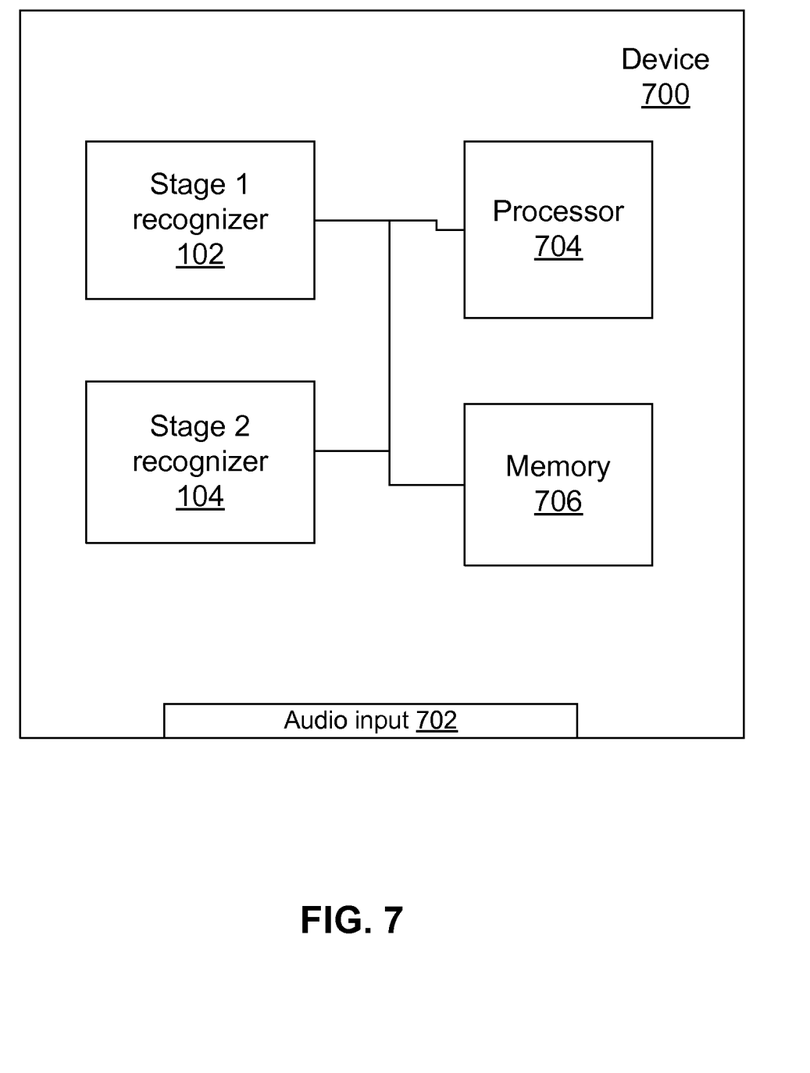
FIG. 7 shows an example of a device including both stage 1 recognizer and stage 2 recognizer according to one embodiment.

FIG. 7 shows an example of a device 700 including both stage 1 recognizer 102 and stage 2 recognizer 104 according to one embodiment. An audio input 702 receives an acoustic input signal. A processor 704 and memory 706 are used by stage 1 recognizer 102 and stage 2 recognizer 104. As described above, fewer CPU cycles of processor 704 may be used by stage 1 recognizer 102 as compared with stage 2 recognizer 104. Further, memory 706 may be random access memory (RAM) where a smaller amount of RAM is used by stage 1 recognizer 102 than stage 2 recognizer 104.

Figure 8:
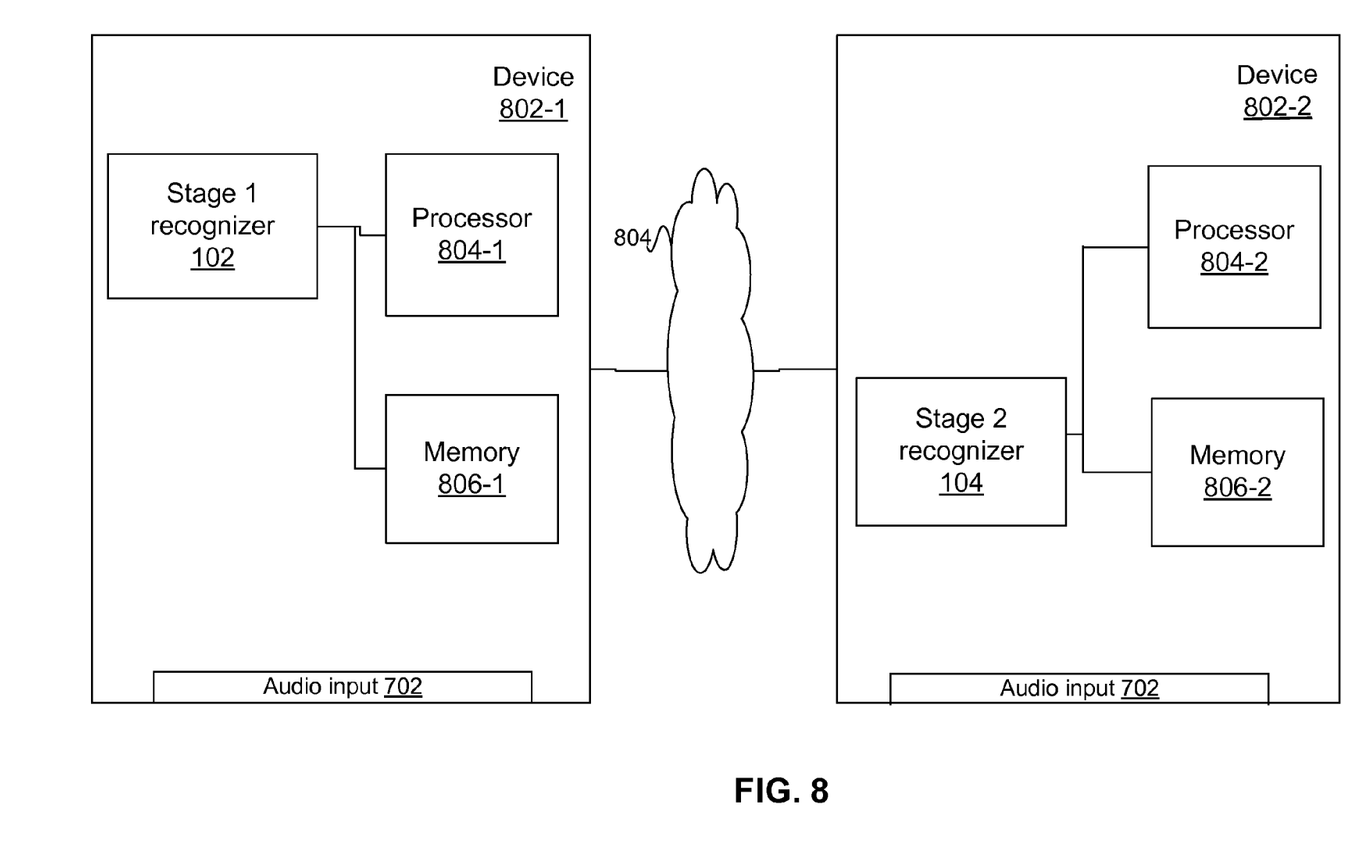
FIG. 8 shows a system for performing speech recognition using two different devices according to one embodiment.

In a different example, FIG. 8 shows a system 800 for performing speech recognition using two different devices according to one embodiment. As shown, a first device 802-1 includes stage 1 recognizer 102 and a second device 802-2 includes stage 2 recognizer 104. First device 802-1 may be a mobile device that is co-located with a user to receive an acoustic input signal at audio input 702. First device 802-1 may communicate with second device 802-2 through a network 808. For example, network 804 may be a wide area network (WAN) or a local area network (LAN). Also, second device 802-2 may be a server.

Stage 1 recognizer 102 may use processor 804-1 and memory 806-1 of device 802-1 and second device 802-2 may use processor 804-2 and memory 806-2 of second device 802-2. In one embodiment, second device 802-2 may be a more powerful computing device thus allowing processing to be offloaded to the more powerful device, which may use less power and battery life on first device 802-1.

Various examples will now be described. A device may be a tablet computer being used at a user's home. The tablet computer may be in standby mode. A first user may be having a conversation with a second user about where they would like to vacation this summer Stage 1 recognizer 102 is always on and listening for keywords in the classifications of hungry, travel, shopping, and research. As stage 1 recognizer 102 recognizes keywords, a classification 206 may be selected. For example, a keyword may be recognized as "vacation" and then other keywords may be recognized that confirm that the "travel" classification should be determined, such as "flight", and "travel". It is determined that the travel classification should be selected and stage 2 recognizer 104 should be activated.

Stage 2 recognizer 104 receives the trigger to activate and also may receive information that a conversation is occurring about the classification of "travel", and that it appears to be a vacation. At this point, stage 2 recognizer 104 may take over listening to the conversation. Stage 2 recognizer 104 may be able to decipher whole sentences and may hear a sentence "Maybe we should go biking in Ireland." The classification of "travel" may be used to determine content for the response. For example, travel vacation content is searched in the area of biking and Ireland. At this point, a response may be determined that pictures of Ireland should be output and a coupon for travel for biking in Scotland (or wherever high ranking deals or specials can be found). The pictures of Ireland may be output to an interface, such as the tablet computer screen. Also, a clickable coupon may be displayed in a corner of the screen to provide a special package deal for biking in Scotland. The biking may be in Scotland even though the user had mentioned biking in Ireland because this was the closest coupon to what was really desired.

If the responses had a higher ranking, then the output method might have been different. For example, a verbal output may have been provided that would either notify the user of the pictures or coupon or some other information may be provided that Ireland has bad storms even in the summertime and perhaps another country, such as Holland, may be considered where Holland has nicer weather and excellent bike trails. If a special fare for biking in Ireland were available for 24 hours, the device might determine it was relevant and urgent enough to verbally interrupt the discussion, and say "excuse me there is a special offer for biking in Ireland available for 24 hours, please see the screen to click for details"

In another example, a user may be using a computing device to perform searches through the Internet. For example, the user may be searching for vacations using a travel website. While the search results are being provided, the output of stage 2 recognizer 104 may be used to narrow the results. For example, the result set from the search query may be narrowed. In one example, either the websites returned may be limited to biking in Ireland websites or additional websites with biking in Holland may be provided. Other optimizations may also be provided during the search by the user.

In another example, when looking for a movie to download, stage 2 recognizer 104 may recall different concepts that have been discussed, such as sports, an actor's name, or sitcoms. These shows are then the ones moved to the top of the guide. Then, a user may refine the choices even more by providing more input for specific phrases for what has been shown. Additionally, ordering by voice may then be performed.

Accordingly, particular embodiments provide an always on recognizer that uses low power. The speech recognition algorithm may be more lightweight than the stage 2 recognizer algorithm. A trigger is not needed to turn on stage 1 recognizer 102. However, stage 1 recognizer 102 performs general speech recognition for certain keywords associated with classifications 206.

Stage 2 recognizer 104 is activated without a trigger from a user. Rather, the trigger is from stage 1 recognizer 102. Because a user has not specifically called stage 2 recognizer 104 to ask for a response, errors in stage 2 recognizer 104 may not be considered fatal. For example, stage 2 recognizer 104 may evaluate the responses before outputting the response. If the response is not deemed acceptable, then no response may be output. Thus, errors in speech recognition may be tolerated. Because the user has not asked for a response, then the user will not know that a response with an error in it was not provided. However, if the user had asked for a specific response, then it would be unacceptable for errors to be in the response. Further, using stage 2 recognizer 104 to turn on only when needed uses less power and can conserve battery life for devices.

Particular embodiments may be implemented in a non-transitory computer-readable storage medium for use by or in connection with the instruction execution system, apparatus, system, or machine. The computer-readable storage medium contains instructions for controlling a computer system to perform a method described by particular embodiments. The instructions, when executed by one or more computer processors, may be operable to perform that which is described in particular embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents may be employed without departing from the scope of the invention as defined by the claims.

What is claimed is:

1. A method comprising:
receiving an acoustic input signal at a first stage recognizer, the first stage recognizer being configured to recognize the acoustic input signal in an always on mode;
classifying, by a computing device, portions of the acoustic input signal into different classifications using a first speech recognition algorithm, the different classifications corresponding to different topics of interest, each classification being associated with a list of keywords for its corresponding topic of interest;
determining, based on the classifying, that a particular topic of interest is being discussed in the acoustic input signal; and
triggering, in response to the determining, a second stage recognizer to turn on in order to recognize the acoustic input signal, wherein the second stage recognizer uses a second speech recognition algorithm that is different from the first speech recognition algorithm, wherein the second stage recognizer recognizes the acoustic input signal based on the particular topic of interest, and
wherein the second stage recognizer is configured to, upon recognizing the acoustic input signal:
evaluate one or more potential responses to the recognized acoustic input signal;
if at least one response in the one or more potential responses is deemed acceptable, output the at least one response to a user that originated the acoustic input signal; and
if no response in the one or more potential responses is deemed acceptable, refrain from outputting anything to the user.

2. The method of claim 1, wherein the first stage recognizer uses a vocabulary that is smaller than a vocabulary used by the second stage recognizer.

3. The method of claim 1, wherein the first stage recognizer uses less memory and computer processing unit (CPU) cycles than the second stage recognizer.

4. The method of claim 1, wherein the first stage recognizer operates in a lower power mode than the second stage recognizer.

5. The method of claim 1 wherein the classifying takes into account frequency, order, and distance in time of phrases in the acoustic input signal that match classification keywords.

6. A method comprising:
 receiving, by a computing device, a signal from a first stage recognizer based on recognition of an acoustic input signal and classification of portions of the acoustic input signal into different classifications using a first speech recognition algorithm, wherein the first stage recognizer is configured to recognize the acoustic input signal in an always on mode, wherein the different classifications correspond to different topics of interest, and wherein each classification is associated with a list of keywords for its corresponding topic of interest;
 activating, by the computing device, a second stage recognizer upon receiving the signal in order to recognize the acoustic input signal, wherein the second stage recognizer uses a second speech recognition algorithm that is different from the first speech recognition algorithm, and wherein the second stage recognizer recognizes the acoustic input signal based on a particular topic of interest that is determined, by the first stage recognizer, to be discussed in the acoustic input signal;
 evaluating one or more potential responses to the recognized acoustic input signal;
 if at least one response in the one or more potential responses is deemed acceptable, outputting the at least one response to a user that originated the acoustic input signal; and
 if no response in the one or more potential responses is deemed acceptable, refraining from outputting anything to the user.

7. The method of claim 6, wherein evaluating the one or more potential responses comprises:
 ranking the one or more potential responses based on one or more criteria.

8. The method of claim 7, wherein a response in the one or more potential responses is deemed acceptable if its ranking crosses a predetermined threshold.

9. The method of claim 6, further comprising:
 determining an output method in a plurality of output methods; and
 outputting the at least one response based on the output method.

10. The method of claim 9, wherein the output method is determined based on a relevance factor, urgency factor, and an importance factor assigned to the at least one response.

11. The method of claim 6, wherein the acoustic input signal is received through a network from the first stage recognizer.

12. The method of claim 6 wherein the classifications are based on frequency, order, and distance in time of phrases in the acoustic input signal that match classification keywords.

13. A system comprising:
 a first stage recognizer operating in an always on mode, the first stage recognizer being configured to:
  receive an acoustic input signal;
  classify portions of the acoustic input signal into different classifications using a first speech recognition algorithm, the different classifications corresponding to different topics of interest, each classification being associated with a list of keywords for its corresponding topic of interest;
  determine, based on the classifying, that a particular topic of interest is being discussed in the acoustic input signal; and
  trigger, in response to the determining, a second stage recognizer to turn on in order to recognize the acoustic input signal; and
 a second stage recognizer configured to:
  recognize, in response to the triggering performed by the first stage recognizer, the acoustic input signal, wherein the second stage recognizer uses a second speech recognition algorithm that is different from the first speech recognition algorithm, and wherein the second stage recognizer recognizes the acoustic input signal based on the particular topic of interest;
  evaluate one or more potential responses to the recognized acoustic input signal;
  if at least one response in the one or more potential responses is deemed acceptable, output the at least one response to a user that originated the acoustic input signal; and
  if no response in the one or more potential responses is deemed acceptable, refrain from outputting anything to the user.

14. The system of claim 13, wherein the first stage recognizer and the second stage recognizer are located in a same device.

15. The system of claim 14, wherein:
 the device includes a processor and memory,
 the first stage recognizer uses less memory and less processing cycles of the processor during speech recognition.

16. The system of claim 13, wherein the first stage recognizer is located in a first device and the second stage recognizer is located in a second device.

17. The system of claim 16, wherein the first device receives the acoustic input signal and sends the acoustic input signal to the second device over a network.

18. The system of claim 13 wherein the first stage recognizer classifies the portions of the acoustic input signal based on frequency, order, and distance in time of phrases in the acoustic input signal that match classification keywords.

* * * * *